United States Patent
Sustic et al.

(10) Patent No.: US 10,160,888 B2
(45) Date of Patent: Dec. 25, 2018

(54) PROPYLENE-BASED AMORPHOUS POLY-ALPHA-OLEFINS (APAOS) FORMULATED WITH HEXENE-1 MONOMER CONTAINING AMORPHOUS POLY-ALPHA-OLEFINS FOR USE IN HOT MELT ADHESIVES

(71) Applicant: REXtac LLC., Odessa, TX (US)

(72) Inventors: Andres Sustic, Odessa, TX (US); Nick Fowler, Odessa, TX (US); Enrico Buenacosa, Odessa, TX (US); James Haselman, Odessa, TX (US)

(*) Notice: Subject to any disclaimer, the term of this patent is extended or adjusted under 35 U.S.C. 154(b) by 0 days.

(21) Appl. No.: 15/276,936

(22) Filed: Sep. 27, 2016

(65) Prior Publication Data
US 2017/0088754 A1    Mar. 30, 2017

Related U.S. Application Data

(60) Provisional application No. 62/234,996, filed on Sep. 30, 2015.

(51) Int. Cl.
| | | |
|---|---|---|
| C09J 123/14 | (2006.01) | |
| C09J 11/06 | (2006.01) | |
| C09J 123/22 | (2006.01) | |

(52) U.S. Cl.
CPC ............ *C09J 123/14* (2013.01); *C09J 11/06* (2013.01); *C09J 123/22* (2013.01); *C09J 2453/00* (2013.01)

(58) Field of Classification Search
CPC ........ C09J 123/14; C09J 123/22; C09J 11/06; C09J 2324/10; C09J 2324/00; C09J 2453/00; C09J 2205/114; C08L 23/14; C08L 53/02
See application file for complete search history.

(56) References Cited

U.S. PATENT DOCUMENTS

| | | |
|---|---|---|
| 3,954,697 A | 5/1976 | McConnell et al. |
| 4,072,813 A | 2/1978 | McConnell et al. |
| 4,259,470 A | 3/1981 | Trotter et al. |
| 4,264,756 A | 4/1981 | Trotter et al. |
| 4,309,522 A | 1/1982 | Dietrich et al. |
| 4,322,514 A | 3/1982 | Miyoshi et al. |
| 4,415,718 A | 11/1983 | Miyoshi et al. |
| 4,826,939 A | 5/1989 | Stuart, Jr. |
| 5,262,216 A | 11/1993 | Popat et al. |
| 5,274,037 A | 12/1993 | Miller |
| 5,302,675 A | 4/1994 | Sustic et al. |
| 5,482,982 A * | 1/1996 | Lakshmanan et al. ..... C08L 23/0815 524/68 |
| 5,637,665 A | 6/1997 | Sustic et al. |
| 5,681,913 A | 10/1997 | Sustic et al. |
| 5,714,554 A | 2/1998 | Sustic et al. |
| 6,586,543 B1 | 7/2003 | Wey et al. |
| 6,653,385 B2 | 11/2003 | Wang et al. |
| 6,872,279 B1 | 3/2005 | Kolowrot et al. |
| 7,517,579 B2 | 4/2009 | Campbell et al. |
| 8,551,270 B2 | 10/2013 | Previty et al. |
| 2007/0117906 A1 * | 5/2007 | Bach et al. ............ C09J 123/14 524/487 |
| 2010/0059178 A1 | 3/2010 | Jiang et al. |
| 2015/0148473 A1 * | 5/2015 | Sustic et al. ........... C09J 123/08 524/505 |

FOREIGN PATENT DOCUMENTS

EP        0211311 A2    2/1987

* cited by examiner

*Primary Examiner* — Nathan M Nutter
(74) *Attorney, Agent, or Firm* — Buskop Law Group, P.C.; Wendy Buskop

(57) ABSTRACT

Amorphous poly-alpha-olefins (APAOs) such as propylene-co-hexene-1-co-butene-1 and propylene-hexene-1 are used as tackifiers in hot melt adhesive formulations.

18 Claims, No Drawings

PROPYLENE-BASED AMORPHOUS POLY-ALPHA-OLEFINS (APAOS) FORMULATED WITH HEXENE-1 MONOMER CONTAINING AMORPHOUS POLY-ALPHA-OLEFINS FOR USE IN HOT MELT ADHESIVES

CROSS-REFERENCE TO RELATED APPLICATIONS

This application claims the benefit of U.S. Provisional Application No. 62/234,996, filed on Sep. 30, 2015.

STATEMENT REGARDING FEDERALLY SPONSORED RESEARCH OR DEVELOPMENT

Not Applicable

BACKGROUND OF THE INVENTION

1. Field of the Invention

The present invention generally relates to copolymers. More specifically, it relates to amorphous poly-alpha-olefin (APAO) polymers useful as components in hot melt adhesive formulations.

2. Description of the Related Art including information disclosed under 37 CFR 1.97 and 1.98

Hot melt adhesives (HMAs) are a form of thermoplastic adhesive that is designed to be applied in the molten state. The glue is tacky when hot, and solidifies in a few seconds to about one minute. Hot melt adhesives may also be applied by dipping or spraying.

In industrial use, hot melt adhesives provide several advantages over solvent-based adhesives. Volatile organic compounds are reduced or eliminated, and the drying or curing step is eliminated. Hot melt adhesives have long shelf life and usually may be disposed of without special precautions. Some of the disadvantages involve thermal load of the substrate, limiting use to substrates not sensitive to higher temperatures, and loss of bond strength at higher temperatures, up to complete melting of the adhesive. This may be reduced by using a reactive adhesive that, after solidifying, undergoes further curing—e.g., by moisture (e.g., reactive urethanes and silicones), or is cured by ultraviolet radiation. Some HMAs may not be resistant to chemical attacks and weathering. HMAs do not lose thickness during solidifying; solvent-based adhesives may lose up to 50-70% of layer thickness during drying Holt melt adhesives of the prior art include rubber-based HMAs, acrylic-based HMAs, silicone-based HMAs, and metallocene polyethylene- and polypropylene-based HMAs.

Amorphous polyolefin (APO/APAO) polymers are compatible with many solvents, tackifiers, waxes, and polymers; they find wide use in many adhesive applications. APO hot melt adhesives have good fuel and acid resistance, moderate heat resistance, are tacky, soft and flexible, have good adhesion and longer open times than crystalline polyolefins. APOs tend to have lower melt viscosity, better adhesion, longer open times and slow set times than comparable Ethylene-vinyl acetate (EVA) copolymers. Some APOs may be used alone, but often they are compounded with tackifiers, waxes, and plasticizers (e.g., mineral oil, poly-butene oil). Examples of APOs include amorphous (atactic) propylene (APP), amorphous propylene/ethylene (APE), amorphous propylene/butene (APB), amorphous propylene/hexene (APH), and amorphous propylene/ethylene/butene. APP is harder than APE, which is harder than APB, which is harder than APH, in accordance with decreasing crystallinity. APOs show relatively low cohesion, the entangled polymer chains have fairly high degree of freedom of movement. Under mechanical load, most of the strain is dissipated by elongation and disentanglement of polymer chains, and only a small fraction reaches the adhesive-substrate interface. Cohesive failure is therefore a more common failure mode of APOs Amorphous poly-alpha-olefins (APAO) are produced by the (co-) polymerization of α-olefins, e.g. propylene or 1-butene with Ziegler-Natta catalysts. The (co-)polymers have an amorphous structure which makes them useful for the production of hot melt adhesives.

U.S. Pat. No. 5,302,675 to A. Sustic and G. C. Allen describes high tensile strength amorphous 1-butene/propylene copolymers.

U.S. Pat. No. 5,681,913 to A. Sustic and G. C. Allen describes high tensile strength amorphous 1-butene/propylene and ethylene/propylene copolymers.

U.S. Pat. No. 5,637,665 to A. Sustic and G. C. Allen describes high tensile strength amorphous 1-butene/propylene and ethylene/propylene copolymers.

U.S. Pat. No. 5,714,554 to A. Sustic and G. C. Allen describes high tensile strength amorphous 1-butene/propylene and ethylene/propylene copolymers.

U.S. Pat. No. 6,586,543 to H. G. Wey and N. Schlueter describes a process for the preparation of substantially amorphous poly-alpha-olefins.

U.S. Pat. No. 4,309,522 to J. Dietrich, W. Dittmann, A. Frese and W. Kilian describes a process for the production of extensively amorphous butene-1-propene-ethene terpolymers having a high softening point.

U.S. Pat. No. 4,322,514, to M. Miyoshi, K. Matsuura and Y. Tajima describes a process for preparing a copolymer.

U.S. Pat. No. 4,415,718 to M. Miyoshi, K. Matsuura and Y. Tajima describes a terpolymer produced from ethylene, propylene and butylene-1.

U.S. Pat. No. 8,551,270 to Previty et al. describes a pressure-sensitive shrink label.

The following references describe the synthesis of 1-hexene-containing terpolymers:

U.S. Pat. No. 3,954,697 to McConnell, et al. and entitled "Poly(higher-1-olefin-co-propylene) copolymers as hot melt, pressure sensitive adhesives."

U.S. Pat. No. 4,072,813 to McConnell et al. and entitled "Poly(higher-1-olefin/1-butene) copolymers as hot melt pressure-sensitive adhesives."

U.S. Pat. No. 4,259,470 to Trotter et al. and entitled "Propylene/1-butene or 1-pentene/higher 1-olefin copolymers useful as pressure sensitive hot melt adhesives."

U.S. Pat. No. 4,264,756 to Trotter et al. and entitled "Substantially amorphous olefin copolymers and compatible tackifying resins useful as hot melt pressure sensitive adhesives."

U.S. Pat. No. 4,826,939 to Stuart and entitled "Highly Amorphous Olefin Terpolymer."

U.S. Pat. No. 5,274,037 to Miller and entitled "Elastomeric Composition Containing Elastomer and Amorphous Propylene/Hexene Copolymer."

U.S. Pat. No. 5,262,216 to G. H. Popat and T. Mammen describes a pressure sensitive label assembly wherein a propylene-co-hexene-1 copolymer is used in a formulated form.

U.S. Pub. No. 2010/0059178 by Peijun Jiang et al. describes polyolefin adhesive compositions.

European Patent Application EP 0211311 describes a self-adhesive absorbing article and a method for the preparation of a hot-melt adhesive.

U.S. Pat. No. 6,872,279, to Kolowrot, et al., describes a sprayable hot melt adhesive.

U.S. Pat. No. 6,653,385, to Wang et al. describes a hot melt adhesive composition based on a blend of amorphous poly alpha olefin and syndiotactic polypropylene.

U.S. Pat. No. 7,517,579, Campbell et al., describes tackified amorphous poly alpha olefin bonded structures.

BRIEF SUMMARY OF THE INVENTION

Propylene-co-hexene-1 copolymers, optionally also with added 1-butene monomer to form propylene-co-hexene-1-co-butene-1 terpolymers, are made using a supported Ziegler-Natta catalyst, either with or without an in-reactor-added organosilicon external donor.

Due to the compositional nature of propylene-co-hexene-1 copolymer amorphous poly alpha olefins, APAOs, and optionally propylene-co-hexene-1-co-butene-1 terpolymers, each one of the co-monomers adds a unique set of properties to the APAO.

The use of these APAO copolymers, and alternatively terpolymers, may add unique properties when used as polyalphaolefinic tackifiers (tackifiers) in hot melt adhesive formulations such as those used preferentially in such applications as in personal hygiene (e.g. diapers, feminine hygiene, adult incontinence, elastic attachment, etc.), in assembly, in case and carton sealing, in pressure sensitive adhesives and also in other applications that require such properties as excellent initial as well as aged peel bonds, bonding to a variety of substrates, controllable open time and set time, low temperature flexibility, good temperature resistance, permanent tackiness and other such desirable properties.

DETAILED DESCRIPTION OF THE INVENTION

The HMA subject of this invention is typically made up of a propylene-co-ethylene APAO with an ethylene content of about 1 to 25 wt. %, preferably between about 5 and 20 wt. %, most preferably between 10 and 15 wt. %, or a propylene-co-butene-1 APAO where the butene-1 content is preferably between about 10 wt. % and 80 wt. %, more preferably between about 20 wt. % and about 50 wt. %, and most preferably between about 30 and 40 wt. %. A typical propylene-co-butene-1 copolymer may have about 35 wt. % butene-1. Terpolymers of ethylene, propylene and butene-1 may also be used as the base.

Either one of those APAO co(or ter)-polymers may be formulated with a propylene-co-hexene-1 copolymer, which in this specific application is used as a polyalphaolefinic tackifier (tackifier), and which may be added from anywhere between 0 and 50 wt. %, preferably between 5 and 25 wt. %, more preferably between 8 and 20 wt. % and most preferably between 10 and 15 wt. %, to the propylene-co-ethylene APAO or the propylene-co-butene-1 APAO. The propylene-co-hexene-1 tackifier may have a composition of between about 10 and 80 wt. %, preferably between about 25 and about 60 wt. %, most preferably between about 40 and 60 wt. % of the hexene-1 monomer. This propylene-co-hexene-1 tackifier may be utilized in an unformulated form, that is, as-obtained from the reactor APAO. The melt viscosity of these amorphous tackifiers, measured in a Brookfield Melt Viscometer at 375° F., should be less than 10,000 cps, preferably less than 5000 cps, more preferable less than 2000 cps, most preferably less than 1000 cps.

The addition of another monomer component such as butene-1 to the propylene and hexene-1 composition, may result in a propylene-co-hexene-1-co-butene-1 terpolymer APAO with an even broader envelope of polyalphaolefinic tackifier properties and performance. This terpolymer tackifier may have a butene-1 content of at least 5 wt. %, and up to as high as 40 wt. %; however, it should preferably have about 5 to 25 wt. % and most preferably 5 to 10 wt. % by weight. Moreover, the addition of a so-called external donor of the organosilicon class, such as for example cyclohexylmethyl dimethoxy silane, (CMDMS), or phenyl triethoxysilane (PES), may impart some unique characteristics to the physical and mechanical properties of the co(ter)polymer tackifier, properties that are presumed to reflect favorably in the final performance of the hot melt adhesive containing it.

Although the propylene-co-hexene-1 copolymer is claimed to function as a polyalphaolefinic tackifier in this application, it is also possible to use other co-adjuvants as part of the subject HMA, such as hydrocarbon tackifiers, preferably the type that is considered compatible with APAO polymers. Such hydrocarbon tackifiers are of the partially and fully hydrogenated $C_5$, hydrogenated $C_5$-$C_9$, and hydrogenated DCPD type resins but may be any other tackifier which by its chemical nature can be considered compatible with the APAO polymer. Yet other components may be polyethylene, maleic anhydride grafted polyethylene, Fischer-Tropsch, paraffinic waxes and metallocene waxes. These as well as other similar compatible waxes, have the effect of controlling the melt viscosity and also controlling the rate of set of the HMA. Also, so called liquid plasticizers such as mineral, paraffinic or naphthenic oils, may be used in the formulation to add such properties as control of melt viscosity, tackiness and controllable open time. Also components such as anti-oxidants and UV stabilizers may be added as co-adjuvants. Other compatible polymers which may be included in the formulation of the subject HMA are, for example, hydrogenated styrene block copolymers of the SEBS and SEPS type and polyethylenes such as LLDPE of melt indices (MIs) of typically more than 500 dg/min. Also used, preferably as the minor component, may be the so called metallocene polyethylenes which are known in the art as mPEs and whose composition consists of ethylene copolymerized with such alpha-olefins as 1-butene or 1-hexene or 1-octene. Metallocene polypropylenes (mPP) of the appropriate molecular weight so as to be compatible with the subject APAO polymer, may also be added as a minor component.

It has been found that the use of the propylene-hexene-1 and, or propylene-co-hexene-1-co-butene-1 polyalphaolefinic tackifiers, when added from anywhere between 0 and 50 wt. %, preferably between 5 and 25 wt. %, more preferably between 8 and 20 wt. % and most preferably between 10 and 15 wt. % in neat unadulterated form to the propylene-co-ethylene or the propylene-co-butene-1 copolymer APAOs (and also to the ethylene/propylene/butene-1 terpolymers), or alternatively co-formulated with the above named co-adjuvants, at concentrations of 0 to up to 25 wt. % of tackifier(s), or between 0 to about 15 wt. % of the above-mentioned wax(es), or between 0 and 25 wt. % of the above-mentioned oil(s), results in hot melt adhesives with enhanced properties for use in personal hygiene products (e.g. diapers, feminine hygiene, elastic attachment, etc.), in assembly and other such applications.

The propylene-co-hexene-1 and propylene-co-hexene-1-co-butene-1 tackifiers used in neat form as tackifiers of the propylene-co-ethylene and/or propylene-co-butene-1 APAOs, is an advancement over the older, existing technology of using, non-APAO co-adjuvants such as the classic hydrocarbon tackifiers of the partially and fully hydrogenated $C_5$, hydrogenated $C_5$-$C_9$, and hydrogenated DCPD-type resins but may be any other tackifier which by its chemical nature can be considered compatible with the APAO polymer.

One particular preferred embodiment comprises a) propylene-co-hexene-1 and propylene-co-hexene-1-co-butene-1 polyalphaolefinic tackifiers; b) The above-described propylene-co-ethylene and propylene-butene-1 APAOs; and optionally, c) a hydrocarbon tackifier; d) a wax component of the type(s) described above and e) a liquid plasticizer such as mineral oil or a naphthenic oil.

It is contemplated that the propylene-co-hexene-1 and propylene-co-hexene-1-co-butene-1 polyalphaolefinic tackifiers interact with the long polymeric chains of the propylene-co-ethylene and propylene-butene-1 APAOs in such a way as to result in a HMA with a lower, yet desirable melt viscosity which results in better wetting and penetration of various substrates, porous, or non-porous, resulting in a higher degree of adhesive bonding. Also, the interaction of the multiple components results in a higher yet controllable tackiness for applications which demand a certain degree of tackiness and pressure sensitive adhesiveness. Other interactions will become obvious to the user.

Although particular embodiments of the present invention have been described, they are not intended to limit what this patent covers. One skilled in the art will understand that various changes and modifications may be made without departing from the scope of the present invention as literally and equivalently covered by the following claims.

What is claimed is:

1. A hot-melt adhesive composition comprising: an amorphous propylene-ethylene alpha olefin (APAO) copolymer and 25 wt % to 50 wt % of an amorphous polyalphaolefinic tackifier comprising propylene-hexene-1 copolymer.

2. A hot-melt adhesive composition comprising: an amorphous propylene-ethylene APAO copolymer and 25 wt % to 50 wt % of an amorphous polyalphaolefinic tackifier comprising propylene-hexene-1-butene-1 terpolymer.

3. A hot-melt adhesive composition comprising: an amorphous propylene-butene-1 APAO copolymer and 25 wt % to 50 wt % of an amorphous polyalphaolefinic tackifier comprising propylene-hexene-1 copolymer.

4. A hot-melt adhesive composition comprising: an amorphous propylene-butene-1 APAO copolymer and 25 wt % to 50 wt % of an amorphous polyalphaolefinic tackifier comprising propylene-hexene-1-butene-1 terpolymer.

5. A hot-melt adhesive composition comprising: an amorphous ethylene-propylene-butene-1 APAO terpolymer and 25 wt % to 50 wt % of an amorphous polyalphaolefinic tackifier comprising propylene-hexene-1 copolymer.

6. A hot-melt adhesive composition comprising: an amorphous ethylene-propylene-butene-1 APAO terpolymer and 25 wt % to 50 wt % of an amorphous polyalphaolefinic tackifier comprising propylene-hexene-1-butene-1 terpolymer.

7. The hot-melt adhesive composition recited in claim 1, wherein the amorphous tackifier additionally comprises an organosilicon external donor.

8. The hot-melt adhesive composition recited in claim 7, wherein the organosilicon external donor is cyclohexylmethyl dimethoxy silane (CMDMS) or phenyl triethoxysilane (PES).

9. The hot-melt adhesive composition recited in claim 2, wherein the amorphous tackifier additionally comprises an organosilicon external donor.

10. The hot-melt adhesive composition recited in claim 9, wherein the organosilicon external donor is cyclohexylmethyl dimethoxy silane (CMDMS) or phenyl triethoxysilane (PES).

11. The hot-melt adhesive composition recited in claim 3, wherein the amorphous tackifier additionally comprises an organosilicon external donor.

12. The hot-melt adhesive composition recited in claim 11, wherein the organosilicon external donor is cyclohexylmethyl dimethoxy silane (CMDMS) or phenyl triethoxysilane (PES).

13. The hot-melt adhesive composition recited in claim 4, wherein the amorphous tackifier additionally comprises an organosilicon external donor.

14. The hot-melt adhesive composition recited in claim 13, wherein the organosilicon external donor is cyclohexylmethyl dimethoxy silane (CMDMS) or phenyl triethoxysilane (PES).

15. The hot-melt adhesive composition recited in claim 5, wherein the amorphous tackifier additionally comprises an organosilicon external donor.

16. The hot-melt adhesive composition recited in claim 15, wherein the organosilicon external donor is cyclohexylmethyl dimethoxy silane (CMDMS) or phenyl triethoxysilane (PES).

17. The hot-melt adhesive composition recited in claim 6, wherein the amorphous tackifier additionally comprises an organosilicon external donor.

18. The hot-melt adhesive composition recited in claim 17, wherein the organosilicon external donor is cyclohexylmethyl dimethoxy silane (CMDMS) or phenyl triethoxysilane (PES).

* * * * *